(12) United States Patent
Marchant et al.

(10) Patent No.: US 8,504,913 B2
(45) Date of Patent: Aug. 6, 2013

(54) CLIENT-SIDE COMPONENTS

(75) Inventors: Benoit Marchant, San Jose, CA (US); Charles Jolley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1284 days.

(21) Appl. No.: 11/811,293

(22) Filed: Jun. 8, 2007

(65) Prior Publication Data

US 2008/0307299 A1 Dec. 11, 2008

(51) Int. Cl.
*G06F 17/20* (2006.01)

(52) U.S. Cl.
USPC ............................................ 715/255; 715/234

(58) Field of Classification Search
USPC ................................................. 715/202, 255
See application file for complete search history.

(56) References Cited

U.S. PATENT DOCUMENTS

| | | | | |
|---|---|---|---|---|
| 6,571,253 B1 * | 5/2003 | Thompson et al. | .................... | 1/1 |
| 6,651,108 B2 * | 11/2003 | Popp et al. | .................... | 719/315 |
| 7,207,000 B1 * | 4/2007 | Shen et al. | .................... | 715/207 |
| 7,346,842 B1 * | 3/2008 | Hayton et al. | ................. | 715/234 |
| 7,386,786 B2 * | 6/2008 | Davis et al. | .................... | 715/234 |
| 2002/0111965 A1 * | 8/2002 | Kutter | .......................... | 707/513 |
| 2002/0188613 A1 * | 12/2002 | Chakraborty et al. | ........ | 707/100 |
| 2003/0014478 A1 * | 1/2003 | Noble | ............................ | 709/203 |
| 2003/0018954 A1 * | 1/2003 | Ponticelli et al. | ............. | 717/106 |
| 2003/0225774 A1 * | 12/2003 | Davidov et al. | ............... | 707/100 |
| 2004/0117439 A1 * | 6/2004 | Levett et al. | ................... | 709/203 |
| 2004/0117839 A1 * | 6/2004 | Watson et al. | ................. | 725/87 |
| 2004/0205564 A1 * | 10/2004 | Brayton et al. | ............... | 715/513 |
| 2005/0022129 A1 * | 1/2005 | Borenstein et al. | ........... | 715/734 |
| 2005/0050155 A1 * | 3/2005 | McGee et al. | ................ | 709/213 |
| 2006/0064467 A1 * | 3/2006 | Libby | ............................ | 709/217 |
| 2006/0184638 A1 * | 8/2006 | Chua et al. | .................... | 709/217 |
| 2006/0190561 A1 * | 8/2006 | Conboy et al. | ................ | 709/217 |
| 2007/0061486 A1 * | 3/2007 | Trinh et al. | .................... | 709/246 |
| 2007/0245232 A1 * | 10/2007 | Wake et al. | .................... | 715/513 |
| 2007/0271389 A1 * | 11/2007 | Joshi et al. | .................... | 709/231 |
| 2008/0109477 A1 * | 5/2008 | Lue | ................................ | 707/102 |
| 2008/0222504 A1 * | 9/2008 | Chitturi | ......................... | 715/201 |
| 2009/0070413 A1 * | 3/2009 | Priyadarshan et al. | ........ | 709/203 |
| 2009/0300111 A1 * | 12/2009 | Rana | ............................. | 709/203 |

(Continued)

OTHER PUBLICATIONS

"IE DOM inspector Version 1.5.3 Released Jun. 7, 2006 Screen Print Out and Domenstration", release date: Jun. 7, 2006, retrieved date: Jan. 21, 2013, URL:<www.ieinspector.com/dominspector/download.html>.*

(Continued)

*Primary Examiner* — Laurie Ries
*Assistant Examiner* — Mustafa Amin
(74) *Attorney, Agent, or Firm* — Womble Carlyle Sandridge & Rice LLP

(57) ABSTRACT

Generating web pages dynamically at a client is disclosed. In some embodiments, when a web application or other code determines that a page is to be displayed, a set of components required to generate the page dynamically at the client is determined. Any components not already available at the client is obtained from a server. In some embodiments each component includes a display portion and may include one or both of a set of binding declarations and a logic portion. The components are parsed at the client and used to generate the page dynamically at the client, e.g., by generating associated portions of the document object model (DOM), retrieving JavaScript™ or other functions/classes and linking them to the respective portions of the DOM to which they correspond, and using the browser to render the page so created.

30 Claims, 8 Drawing Sheets

U.S. PATENT DOCUMENTS

2011/0041053 A1* 2/2011 Liang et al. .................. 715/234
2011/0173178 A1* 7/2011 Conboy et al. ............... 707/709
2012/0330984 A1* 12/2012 Fablet et al. ................. 707/755

OTHER PUBLICATIONS

Dave Hyatt, "Surfin' Safari", date: Aug. 8, 2007, pp. 1-3, URL;<https://www.webkit.org/blog/114/>.*

"How Browsers work", data accessed: May 2, 2013, pp. 1-26, URL:<http://taligarsiel.com/Projects/howbrowserswork1.htm>.*

"MyEclipse Ajax Tools", date: May 12, 2008, pp. 1-15, URL: <http://web.archive.org/web/20080512151217/http://www.myeclipseide.com/htmlpages-func-display-pid-57.html>.*

Jake Howlett, "How to Use FireFox's DOM inspector", Date: Feb. 28, 2005, pp. 1-13 URL:<http://www.codestore.net/store.nsf/unid/BLOG-20050228>.*

* cited by examiner

CLIENT-SIDE COMPONENTS

BACKGROUND OF THE INVENTION

When requested from a client, a page of a web application is typically retrieved from an associated server, where it may reside as a pre-existing file or may be created dynamically at the server by the web application, and a static and fully formed HTML file is sent from the server to the client so that a browser at the client can render the page. The HTML file sent to the client may include client-side scripts that are embedded and/or referenced in the page. Such scripts typically are used to provide dynamic behavior, e.g., in response to user input and/or other events; but if a script requires a new page to be displayed typically the page is retrieved from the server as a fully formed HTML file.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating web pages dynamically at a client is disclosed. In some embodiments, when a web application or other code determines that a page is to be displayed, a set of components required to generate the page dynamically at the client is determined. Any components not already available at the client (e.g., as a result of having been used to generate at the client a page displayed previously) is obtained from a server. In some embodiments each component includes a display portion (e.g., an HTML template) and may include one or both of a set of binding declarations (e.g., binding instance variables to values) and a logic portion (e.g., JavaScript™ or other logic or code that is to be associated with one or more page elements associated with the component). The components are parsed at the client and used to generate the page dynamically at the client, e.g., by generating associated portions of the document object model (DOM), retrieving JavaScript™ or other functions/classes and linking them to the respective portions of the DOM to which they correspond, and using the browser to render the page so created.

Figure 1:
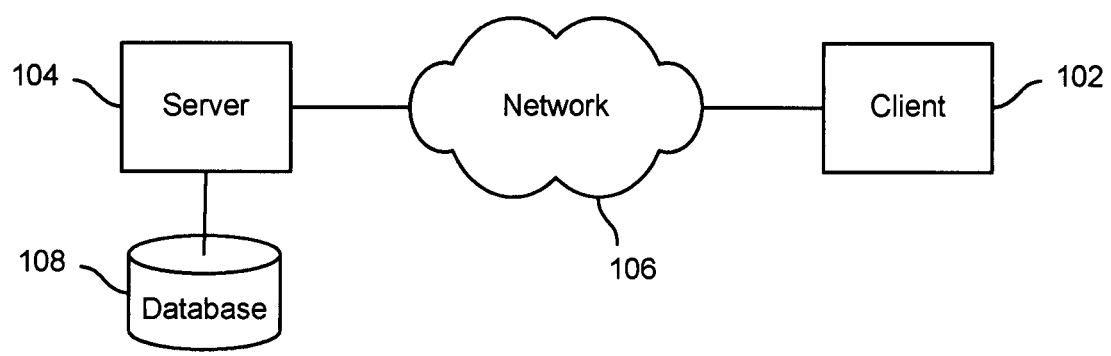
FIG. 1 illustrates an embodiment of a network environment.

FIG. 1 illustrates an embodiment of a network environment. In the example shown, a client 102 communicates with a server 104 via a network 106. Network 106 corresponds to any public or private network, such as a LAN, WAN, the Internet, etc., and facilitates the communication and interchange of information between client 102 and server 104. A database 108 is employed by server 104 to organize and store content. Client 102 may desire to access content and/or a software program or application available from server 104. For example, it may be desirable by client 102 to access a web page, web site, or a web-based application hosted by server 104. A page or other content hosted by server 104 may be requested by client 102, for example, by entering an associated URL into a browser, via an HTTP GET request, via an associated hyperlink, via a dedicated client-side program, etc. In response, in some embodiments, an at least initial definition associated with the desired page or other requested content is provided to client 102 by server 104.

In existing client-server architectures, when a page is requested by a client from a server, the server determines the objects or components needed to assemble the requested page as well as any associated data, unravels the components, and builds the requested page from the components and/or data. A component-based approach to generating a page dynamically at a server is described in U.S. Pat. No. 6,651,108, entitled "Method and Apparatus for Generating Object-Oriented World Wide Web Pages", issued Nov. 18, 2003, which is incorporated herein by reference for all purposes. In such cases, the server provides to the client a static HTML page that can be rendered by a browser at the client. The HTML file provided by the server includes a display layer which defines the manner in which the various elements that comprise the page are to be rendered. In addition, the HTML file may include client-side scripts. For example, scripts defined using any appropriate scripting language such as JavaScript may be embedded in the HTML to implement dynamic functionalities and behaviors associated with the page or elements of the page.

Client-side generation of web pages is disclosed. In some embodiments, when a client requires a new page one or more components and/or associated data that are needed to assemble or build the page at the client are sent from a server to the client, e.g., in response to a request for such components, so that at least portions of the page can be dynamically generated at the client. Once a page is built from its constituent components and/or data at a client, the page can be rendered by a browser at the client. Dynamic generation of a page at the client offloads the processing associated with building a page to the client so that the server is not burdened with processing that can be handled by the client. In some cases, building a page at the client may be quicker than receiving from the server a built page, for example, because the server is busy servicing requests from a plurality of clients. In some embodiments, a component of a page may require client-specific data, which may depend upon factors such as user input or environmental variables at the client. In such cases, it may be more efficient to build a page at the client so that the client does not have to supply such client-specific data to the server when requesting the page.

As previously mentioned, a pre-built HTML file provided to a client by a server may include scripts that implement the logic or dynamic behavior associated with the page. In such cases, scripts are typically embedded within the HTML file and programmed using a procedural and/or prototype-based paradigm. In some embodiments, it is useful to make a scripting language at least in part mimic aspects of object oriented behavior so that useful characteristics of the object oriented paradigm such as encapsulation and reuse can be acquired. This can be accomplished, for example, by defining appropriate declarations and function definitions using the syntax and constructs of the scripting language. Although JavaScript is described in the examples herein, similar techniques can be employed with any other appropriate scripting language. As used herein, a JavaScript "class" actually comprises a JavaScript function implemented in a manner that at least in part allows the function to mimic the functionality of a class in an object oriented paradigm. In some embodiments, the encapsulation of the scripts associated with a page and/or components of the page facilitates the separation of the display layer (e.g., the HTML elements) and the logic (e.g., the scripts) of the page. Since different groups of people may be associated with coding the display layer (e.g., graphic designers) and the logic (e.g., web developers) associated with a page, in some embodiments, it is useful to separate the logic from the display layer of the page as further described herein to reduce the risk of errors that may arise from multiple groups or people contributing to the coding of a particular page or an associated application.

Figure 2:
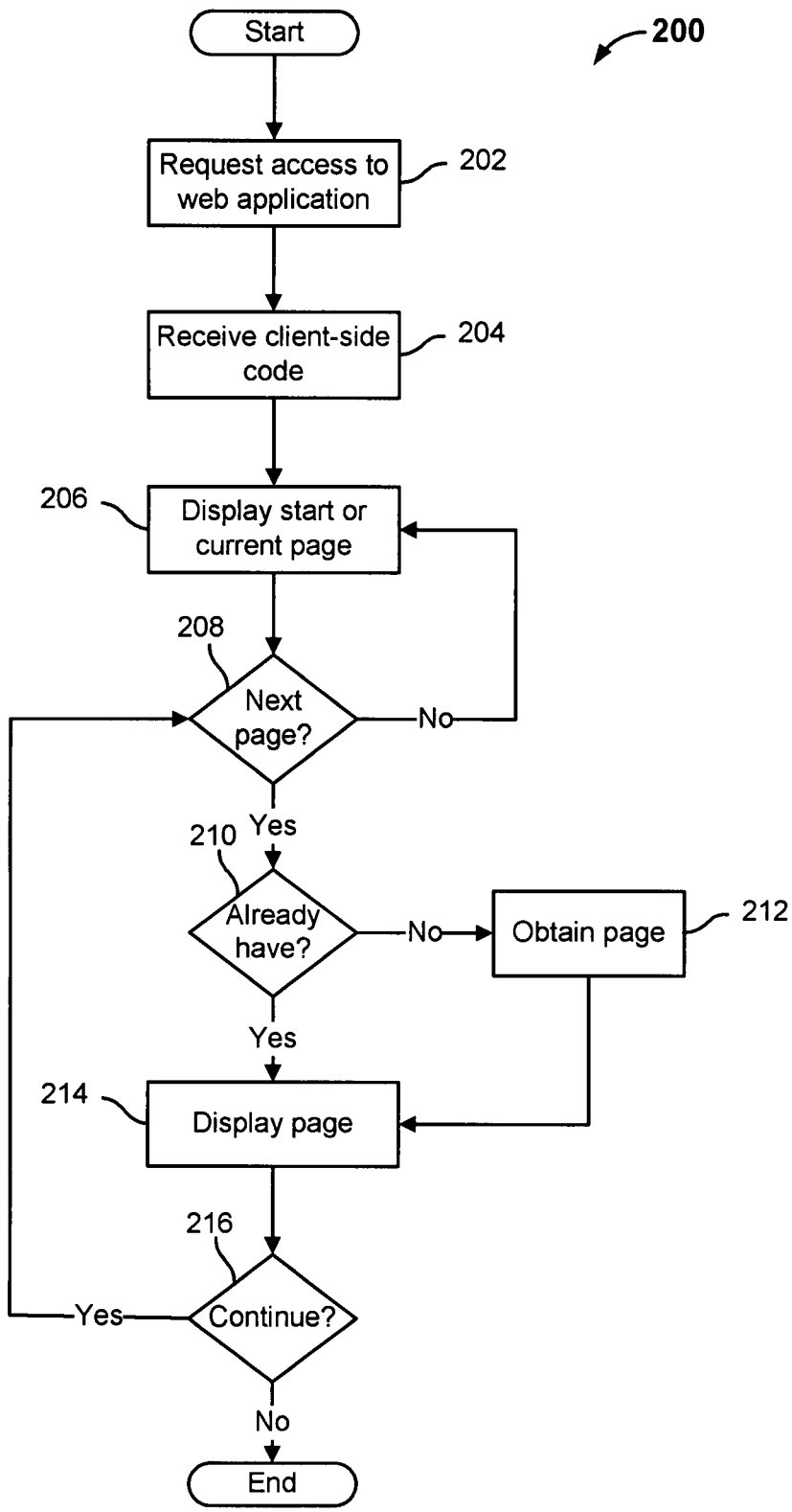
FIG. 2 illustrates an embodiment of a process for accessing a web application at a client.

FIG. 2 illustrates an embodiment of a process for accessing a web application at a client, such as client 102 of FIG. 1. In some embodiments, the web application comprises a Web 2.0 application. At 202, access to a web application or part thereof is requested by a client from an associated server. In various embodiments, a request from a client may be in the form of a URL, an HTTP GET request, via a click on an associated hyperlink, via some other form of navigation to an associated page or content, etc. At 204, client-side code associated with the web application is received from the server. At 206, the start or main page of the web application is displayed by a browser at the client. In some embodiments, the start or main page displayed at 206 is received with the client side code at 204. In some embodiments, components and/or data associated with the start page are received at the client and are assembled into the start page at the client so that the start page can be rendered by a browser for display at 206. In some embodiments, the client-side code received at 204 includes a parser configured to parse at the client components received from the server and use the components to generate a page dynamically at the client. At 208, it is determined whether an indication to display a next page has been received. An indication to display a next page may be received in response to some action taken by a user of the client and/or the client-side code associated with the web application to display a next page. For example, an indication to display a next page may be received at 208 in response to a user providing input (e.g., login information), clicking on or otherwise selecting an option or hyperlink, selecting or configuring a control, etc., with respect to a currently displayed page. In some embodiments, an indication to display a next page may be received from the client-side code of the web application executing a prescribed order of events, for example, with respect to an animation or a gaming application, which in some cases may depend on various forms of user inputs. If it is determined at 208 that no indication to display a next page has been received, process 200 continues at 206 at which the start (or current) page is continued to be displayed. If it is determined at 208 that an indication to display a next page has been received, it is determined at 210 whether the desired page already exists at the client. For example, the page may already exist (e.g., may be cached) at the client if the page was previously displayed at the client. If it is determined at 210 that the page does not already exist at the client, the page is obtained at 212. In some embodiments, 212 includes one or more of requesting the page from the server, receiving the page (e.g., the components and/or data associated with the page), and/or building the page at the client. If it is determined at 210 that the page already exists at the client or upon obtaining the page at 212, the page is displayed (i.e. rendered) at 214. In some embodiments, 210 includes determining whether one or more components and/or data needed to build the next page already exist at the client, and 212 includes requesting and receiving from the server only the components and/or data that do not already exist at the client. At 216 it is determined whether to continue process 200. If it is determined at 216 to continue process 200, process 200 continues at step 208. If it is determined at 216 to not continue process 200, process 200 ends. Although described with respect to the pages of a web application, a process similar to process 200 may be employed to access any content associated with a web application. Although described with respect to a web application, a process similar to process 200 may be employed to access and navigate through the pages and/or other content of a web site or any other content hosted by a server.

Figure 3:
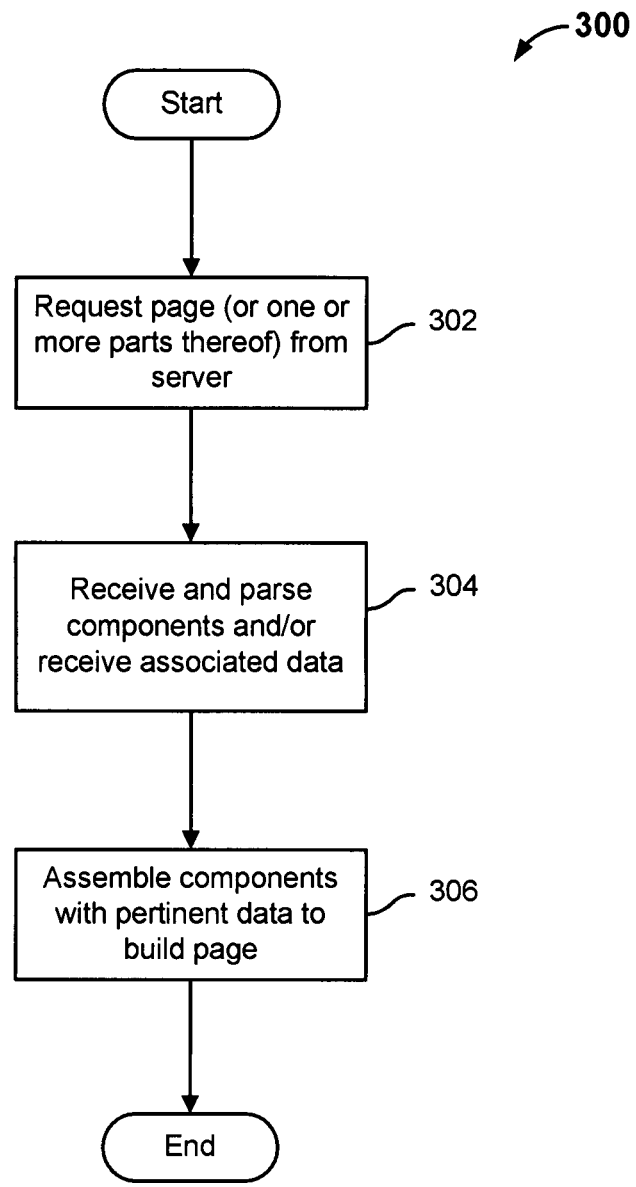
FIG. 3 illustrates an embodiment of a process for obtaining a page at a client.

FIG. 3 illustrates an embodiment of a process for obtaining a page at a client, such as client 102 of FIG. 1. In some embodiments, process 300 is employed at 212 of process 200 of FIG. 2. At 302, a page (or one or more parts thereof) is requested from an associated server. At 304, one or more components are received from the server and parsed. In some cases, 304 includes receiving associated data. At 306, the components associated with a page are assembled together along with any pertinent data to build the page, and process 300 ends. In some embodiments, steps 302 and 304 include requesting and receiving only components and/or data that are not already available at the client. For example, one or more components required to generate a current page may be reused, along the other components retrieved from the server previously, to generate a current page. In some embodiments, 302 and 304 include requesting and receiving components and/or data on demand as needed at the client. In some embodiments, parsing or unraveling a component, such as at 304, includes requesting and receiving from the server appropriate data and/or definitions, such as class definitions, if they do not already exist at the client so that, for example, objects referenced in the component can be instantiated and appropriate values can be assigned to variables. In some embodiments, parsing or unraveling a component, such as at 304, includes requesting and receiving from the server subcomponents referenced in the component. In some embodiments, building a page, such as at 306, includes building a hierarchical tree of logic objects associated with the page analogous to the DOM tree of XHTML elements of the page and/or establishing relationships between objects in the logic tree and elements in the DOM tree. In some embodiments, the hierarchy of logic objects is inferred from the DOM tree of display elements (e.g., XHTML elements) and the relationship between logic objects and the respective DOM elements to which the logic objects are linked. In various embodiments, data, components, objects, and/or class definitions may be obtained synchronously or asynchronously. Although described with respect to obtaining a page, process 300 may be similarly employed to obtain any other type of content.

Figure 4:
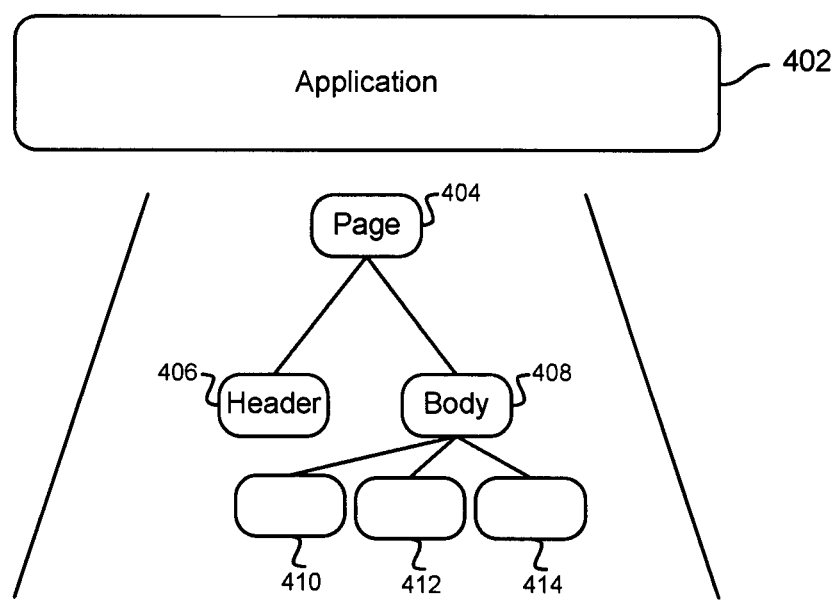
FIG. 4 illustrates an embodiment of an object graph which depicts the hierarchy of components that make up a page of a web application.
Figure 5:
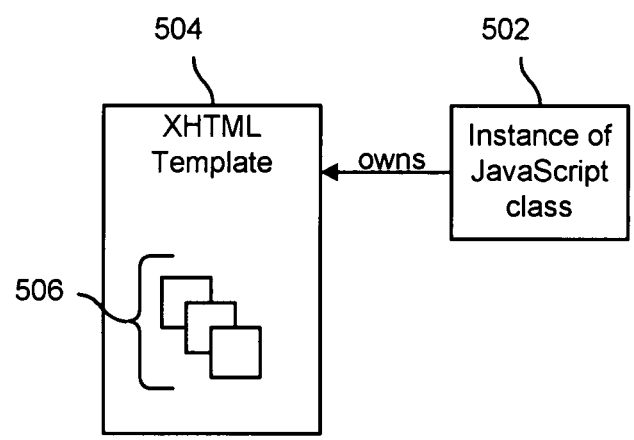
FIG. 5 illustrates an embodiment of the relationships between the various parts of a component.

FIG. 4 illustrates an embodiment of an object graph which depicts the hierarchy of components that make up a page of a web application 402. In the example shown, the "page" level component 404 is the root component, and the other components 406-414 are child components. As used herein, the terms "child component", "subcomponent", and "declared component" are analogous and refer to a component that is declared in another component. A component may include declarations of one or more subcomponents. In some embodiments, a component definition comprises a single (e.g., XHTML) file. In some embodiments, a component is associated with one or more of an instance of a JavaScript class, an XHTML template, and/or binding declaration(s). In some embodiments, the JavaScript class associated with a component defines the dynamic or logic portion of the component, the XHTML template defines static portions (e.g., the display definition) of a component, and the binding declarations are associated with subcomponents of the component. FIG. 5 illustrates an embodiment of the relationships between the various parts of a component. In some embodiments, the instance of a JavaScript class 502 associated with a component owns an XHTML template 504 associated with the component. The XHTML template 504 of a component may include one or more binding declarations associated with one or more subcomponents 506.

In some embodiments, the declaration of a subcomponent includes specifying the subcomponent's owner component. In some embodiments, the declaration of a subcomponent includes specifying the instance of its owner component's JavaScript class. A binding declaration facilitates the synchronization of the instance variables of two components so that, for example, if a property of an owner component changes, the corresponding property of the associated declared component changes and vice versa. In various embodiments, script associated with declarations may be embedded within an XHTML template associated with a component and/or may be defined in one or more separate files that are referenced in the XHTML template. A special script type (e.g., "text/declaration") may be defined and employed within an associated XHTML template to specify the declarations section. When such a special script type is encountered while parsing the XHTML template, a parser defined and/or configured to parse scripts of that type is invoked to parse the associated script. For example, scripts associated with declarations are parsed by a dedicated declarations parser. In some embodiments, the dedicated declarations parser is provided to a client from an associated server. For example, such a parser may be received by the client with client side code at 204 of process 200 of FIG. 2.

In some embodiments, a component may not own its own XHTML template and/or may not have any binding declarations. For example, a component such as a hyperlink may not own an XHTML template of its own but may instead own a tag (e.g., <a>) within a parent XHTML template. In some embodiments, a component may not have any binding declarations, for example, if none of the instance variables of its subcomponents are bound or if the component does not have any subcomponents. In some embodiments, each component is associated with an instance of a JavaScript class. In some embodiments, the JavaScript class associated with a root or page-level component (e.g., 404 of FIG. 4) is determined from the "id" property of the "body" tag of the XTML template of the root component. In some embodiments, the JavaScript class associated with a declared component is specified in the declaration of the declared component. In some embodiments, building a page begins with parsing the root component and successively unraveling subcomponents. An instance of an associated JavaScript class is created for each component as it is unraveled. During the building of a page, data, components, and/or class definitions may be requested from an associated server on demand if not already available at the client. In various embodiments, such content may be obtained from the server synchronously or asynchronously.

Figure 6:
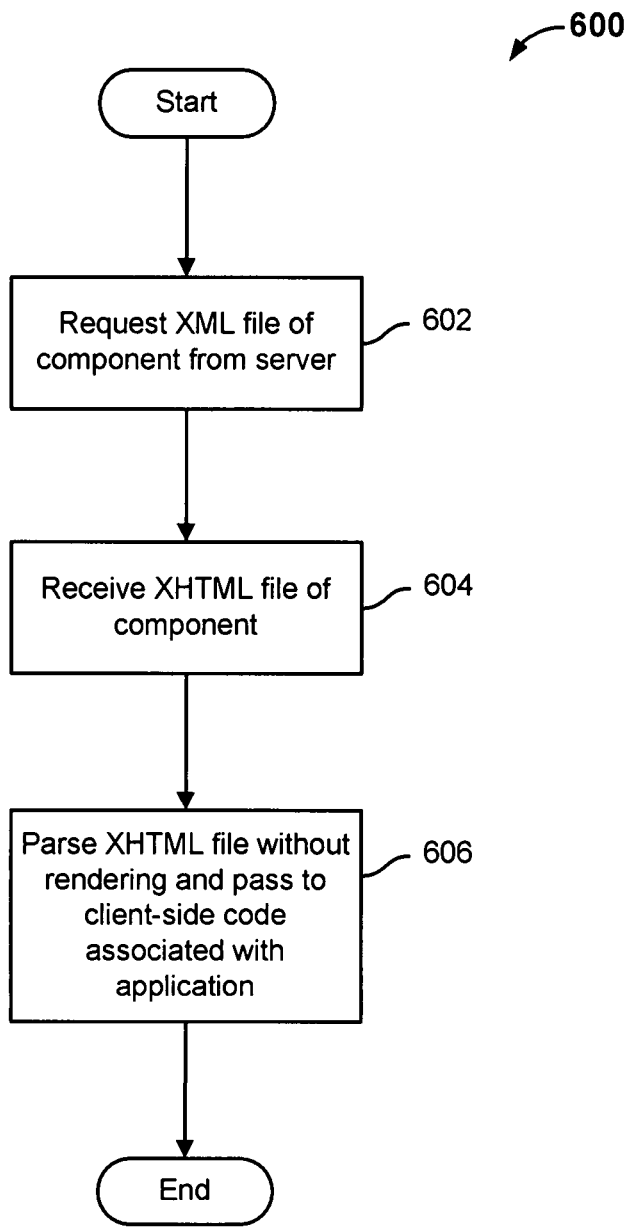
FIG. 6 illustrates an embodiment of a process for obtaining a component from an associated server.

FIG. 6 illustrates an embodiment of a process for obtaining a component from an associated server. In some embodiments, process 600 is employed by a browser at the client. In some embodiments, process 600 is employed to obtain a component that has its own XHTML file or template. Process 600 starts at 602 at which an XML file of a component is requested from the server. In some embodiments, the request for the XML file of the component is made using an XML HTTP request object. Since XHTML is syntactically valid XML, an XHTML file comprising the component can be returned by the server in response to the request for an XML file of the component. At 604, the XHTML file of the component is received. At 606, the received XHTML file is parsed without being rendered and passed to the client-side code of an associated web application so that it can be used in the build of an associated page. Process 600 subsequently ends. Since an XML and not an HTML file was requested at 602 and expected to be received at 604, the browser at the client does not parse and render the XHTML file as an HTML file at 606 but rather parses the XHTML file as an XML file. Thus, existing browser functionality can be leveraged to obtain a component and to parse or unravel the component without rendering the component. Once the client-side code assembles an entire page from the components that comprise the page, the browser can be employed to render the page. In some embodiments, the parsing of a component at 606 includes constructing the DOM tree of the component. Since a DOM tree can be imported into another DOM tree, as components are obtained and unraveled as a page is built, the DOM tree of the page can be constructed by importing the DOM tree of each component into a DOM tree that represents the entire page.

Figure 7:
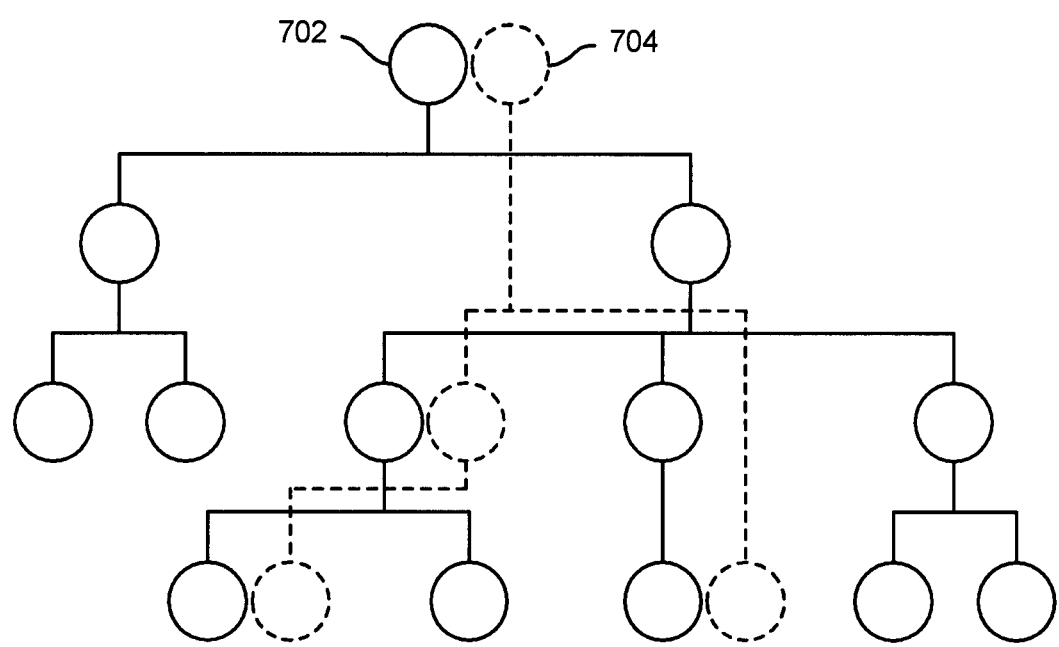
FIG. 7 illustrates an embodiment of the relationships between the logic portions of components and their corresponding display definitions.

FIG. 7 illustrates an embodiment of the relationships between the logic portions of components and their corresponding display definitions. In the given figure, the DOM tree of a page is represented by solid lines, and the associated logic tree is represented by dotted lines. The DOM tree of a page, which represents the hierarchy of HTML elements of the page, may be constructed for a page by a browser at the client as components associated with the page are obtained and unraveled as described above. The elements of the DOM tree are associated with static portions of the page which are defined in the XHTML templates of the components that comprise the page. A logic object exists for each DOM element that is associated with dynamic behavior. The logic object and it's DOM element are matched using the name in the declaration and the DOM object "id" attribute. An event on such a DOM element triggers the logic object associated with that element to execute the functionality associated with that event. The logic tree of the page, which represents the hierarchy of logic objects of the page, may be constructed as the page is being built. In some embodiments, the known hierarchy of the DOM tree of a page can be leveraged to infer and build the logic tree of the page as described further below. Each component of a page is represented by a logic object in the logic tree. The logic tree of a page represents the hierarchy of components of the page. The logic object of a component corresponds in some embodiments to the instance of the JavaScript class associated with the component. The DOM element with which the logic object of a component is associated corresponds to at least a part of the display definition associated with that component, which may, for example, be defined in an associated XHTML template and/or tag. The DOM tree root element 702 and the logic tree root object 704 correspond to the root or page-level component of the associated page.

A button is an example of a component that may be included in a page, which when clicked or otherwise selected results in some functionality or action to be executed. The component definition of the button may include an XHTML template that includes the display definition of the button and an instance of a JavaScript class that implements the functionality associated with clicking on the button. With respect to the representation of FIG. 7, the display definition of the button would be represented by an element in the DOM tree, and the logic associated with the button would be represented by a logic object in the logic tree. A click on the button would result in the functionality associated with a click that is implemented by the logic object of the button to be executed.

In some embodiments, a logic object and the display element that is associated with that logic object share the same name or identifier. In such cases, the names or identifiers of objects in the logic tree and elements in the DOM tree can be employed to determine mappings of associated logic objects and display elements. In some embodiments, the name or identifier associated with a logic object and its corresponding display element includes the name or identifier of the associated component (e.g., the name of the instance of the JavaScript class of the component) so that, for example, the correct mappings of logic objects and display elements can be achieved when multiple components of a given type exist in a page. For example, a page may include several buttons which are each defined by the same component definition but are each associated with a different instance of the associated JavaScript class. Likewise, if a page includes a repetition component, a unique identifier (e.g., an index) that identifies each repetition may be appended to the name or identifier of the instance of the JavaScript class associated with the component to uniquely name or identify a logic object and display element associated with each repetition.

Figure 8:
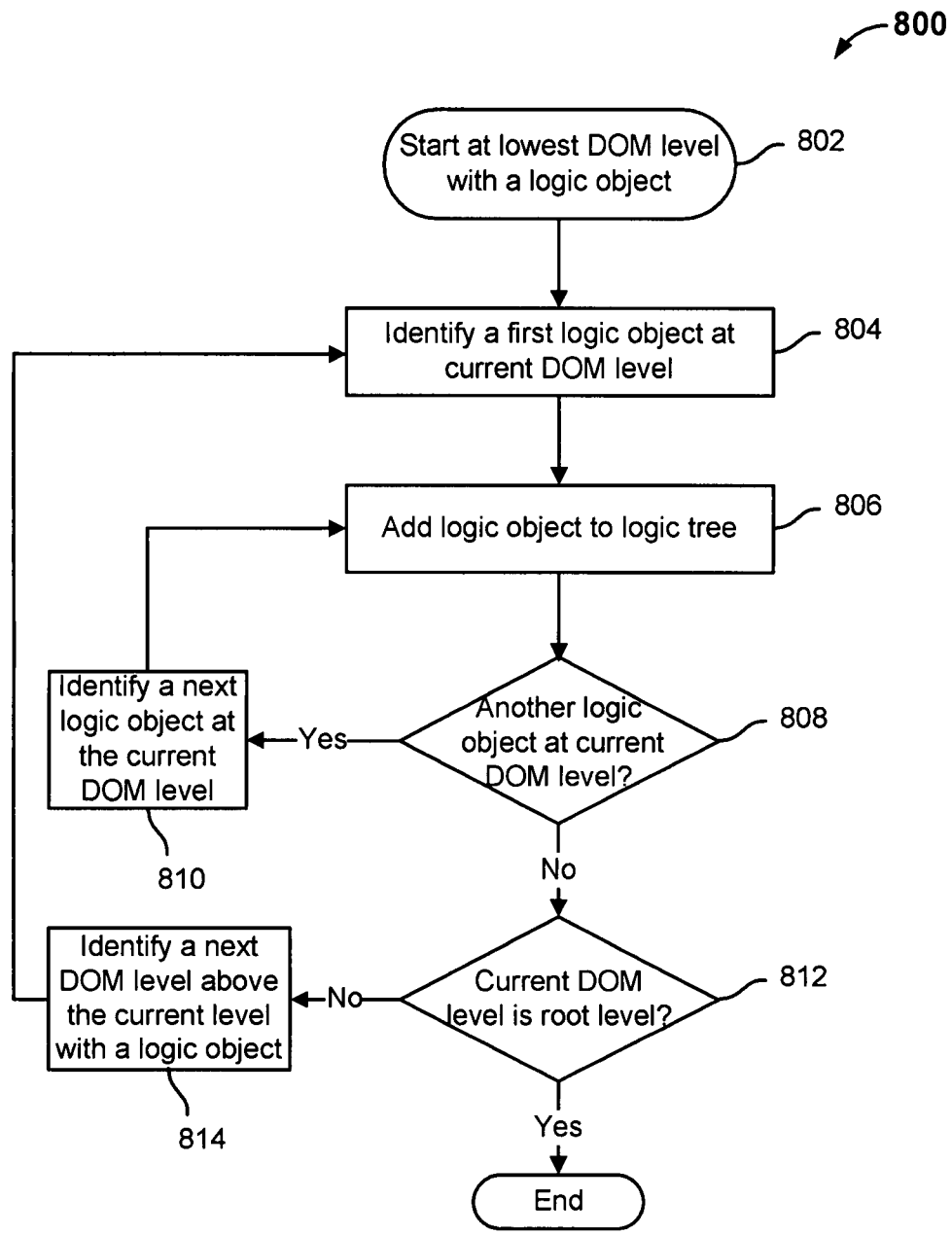
FIG. 8 illustrates an embodiment of a process for inferring the structure of a logic tree from the corresponding DOM tree.

FIG. 8 illustrates an embodiment of a process for inferring the structure of the logic tree from the corresponding DOM tree. As described above, the mapping of a logic object to a DOM element (i.e. the position of an individual logic object in FIG. 7) can in some embodiments be determined by the commonality of the name or identifier of the logic object and its associated DOM element. Process 800 is an example of a manner in which the structure of the logic tree (i.e. the dotted lines in FIG. 7) can be inferred from the structure of the DOM tree given that the logic objects (i.e. dotted circles in FIG. 7) have been mapped to their corresponding DOM elements, e.g., based on their names or other identifiers. Process 800 starts at 802 at the lowest level of the DOM tree at which at least one DOM element is associated with a logic object. At 804, a first logic object at the current DOM level is identified. At 806, the logic object is added to the logic tree. At 808 it is determined whether another logic object exists at the current DOM level. If it is determined that another logic object exists at the current DOM level, a next logic object at the current DOM level is identified at 810, and process 800 continues with step 806. If it is determined that another logic object does not exist at the current DOM level, it is determined at 812 whether the current DOM level is the root (i.e. page) level. If it is determined at 812 that the current DOM level is not the root level, a next DOM level above the current DOM level at which at least one DOM element is associated with a logic object is identified at 814, and process 800 continues at 804 with the next DOM level identified at 814 set as the current DOM level. If it is determined at 812 that the current DOM level is the root level, process 800 ends as the structure of the logic tree has completely been inferred. Process 800 is an example of a bottom-up approach for inferring the structure of the logic tree from the DOM tree. In other embodiments, any other appropriate technique for inferring the structure of the logic tree (e.g., top-down) may be employed.

A browser rendering a page on a client responds to DOM events. An event on a DOM element needs to trigger the logic object associated with the DOM element to respond to the event. For example, a click event on the DOM element of a button needs to be transformed into an action implemented by the logic object of the button. Standard browsers allow event handlers to be attached to DOM elements. In some embodiments, each logic object is registered as an event listener for its corresponding DOM element so that it can directly respond to an event on its DOM element. Each event listener, however, consumes CPU resources to implement event listening functionality. Moreover, latency in at least the initial display or rendering of a page may be introduced while the logic objects are registering as event listeners. Thus, in some embodiments, configuring each logic object as an event listener may be inefficient, especially for pages that include many logic objects. In some embodiments, only the root (i.e. page level) logic object is registered as an event listener, and it provides event listening functionality for all other logic objects. In such cases, for example, an event on a DOM element in the DOM tree is propagated to the root (i.e. page level) DOM element which is detected by the event listening functionality of the root logic object. The root logic object, in turn, propagates the associated information to the corresponding logic object so that it can respond to the event. In the cases in which only the root logic object is configured as an event listener, however, latency in the response to an event may be introduced. Thus, in the two described techniques for event listening, there exists a trade-off between latency in loading a page (if all logic objects are registered as event listeners) and latency in executing a response to an event (if only the root logic object is configured as an event listener). In various embodiments, either of the described techniques or any other appropriate technique for passing DOM events to associated logic objects may be employed. Different techniques may be employed for different pages of the same application.

As described herein, a page may be assembled client-side. Defining object-like behavior for client-side JavaScript code provides a reduction in the amount of needed code and improves maintainability and reusability. Although many of the examples included herein describe assembling a page of a web application client-side, similar techniques can be employed to assemble from its associated components and/or data any type of content hosted by a server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A method for generating a page, comprising:
   receiving, at a client, a plurality of components of the page, the plurality of components comprising a root component and one or more child components, each component being associated with at least a part of the page and each component comprising at least one of a display definition portion and a logic portion;
   constructing, at the client and based on the plurality of components, a document object model (DOM) tree that defines a hierarchy of display elements, wherein each display element defines either a static portion of the page or a dynamic portion of the page and resides at a particular hierarchical level within the DOM tree;
   constructing, at the client and based on both the DOM tree and the plurality of components, a logic tree that defines a hierarchy of logic objects, wherein the constructing comprises:
      adding, for each display element in the DOM tree that defines a dynamic portion of the page, a logic object to the logic tree, wherein the logic object is at a same hierarchical level within the logic tree as the particular hierarchical level at which the display element resides in the DOM tree, and, when executed, carries out a particular action within the page;
   rendering, at the client, the static portions of the page; and
   rendering, at the client, the dynamic portions of the page based on both the DOM tree and the logic tree.

2. The method as recited in claim 1, wherein the display definition portion of a component of the plurality of components comprises an XHTML template or tag.

3. The method as recited in claim 1, wherein the logic portion of a component of the plurality of components comprises a software object.

4. The method as recited in claim 1, wherein the logic portion of a component of the plurality of components comprises an instance of a JavaScript class.

5. The method as recited in claim 1, wherein a component of the plurality of components includes one or more subcomponents.

6. The method as recited in claim 1, wherein a component of the plurality of components includes one or more declarations.

7. The method as recited in claim 1, wherein a component of the plurality of components includes one or more binding declarations.

8. The method as recited in claim 1, wherein the display definition portion of a component of the plurality of components is represented by at least one display element included in the DOM tree of the page.

9. The method as recited in claim 1, wherein the logic portion of a component of the plurality of components is represented by at least one logic object included in the logic tree.

10. The method as recited in claim 1, wherein each logic object in the logic tree registers as an event listener for DOM events associated with the corresponding display element included in the DOM tree.

11. The method as recited in claim 1, wherein a page-level logic object included in the logic tree registers as an event listener for all DOM events that occur within the page.

12. The method as recited in claim 1, wherein a display element in the DOM tree and a logic object in the logic tree that correspond to one another have the same name or identifier.

13. The method as recited in claim 12, wherein the name or identifier is unique.

14. The method as recited in claim 1, further comprising requesting an additional component.

15. The method as recited in claim 14, wherein the additional component is requested in response to receiving a request for another page.

16. The method as recited in claim 14, wherein requesting the additional component comprises requesting an XML file associated with the component.

17. The method as recited in claim 14, wherein receiving the requested additional component at the client comprises receiving an XHTML file of the requested component.

18. The method as recited in claim 17, further comprising parsing the XHTML file of the requested additional component without rendering.

19. The method as recited in claim 1, further comprising receiving client-side code associated with a web application with which the page is associated.

20. A method for providing a page, comprising:
   receiving from a client a request for a page;
   sending to the client a plurality of components of the page, the plurality of components comprising a root component and one or more child components, each component being associated with at least a part of the page and each component comprising at least one of a display definition portion and a logic portion;
   constructing, at the client and based on the plurality of components, a document object model (DOM) tree that defines a hierarchy of display elements, wherein each display element defines either a static portion of the page or a dynamic portion of the page and resides at a particular hierarchical level within the DOM tree;
   constructing, at the client and based on both the DOM tree and the plurality of components, a logic tree that defines a hierarchy of logic objects, wherein the constructing comprises:
      adding, for each display element in the DOM tree that defines a dynamic portion of the page, a logic object to the logic tree, wherein the logic object is at a same hierarchical level within the logic tree as the particular hierarchical level at which the display element resides in the DOM tree, and, when executed, carries out a particular action within the page
   wherein the static portions of the page are rendered at the client based on the DOM tree; and
   wherein the dynamic portions of the page are rendered at the client based on both the DOM tree and the logic tree.

21. A system for generating a page, comprising:
   a processor at a client configured to:
      receive a plurality of components of the page, the plurality of components comprising a root component and one or more child components, each component being associated with at least a part of the page and each component comprising at least one of a display definition portion and a logic portion;
      construct, based on the plurality of components, a document object model (DOM) tree that defines a hierarchy of display elements, wherein each display element defines either a static portion of the page or a dynamic portion of the page and resides at a particular hierarchical level within the DOM tree;

construct, based on both the DOM tree and the plurality of components, a logic tree that defines a hierarchy of logic objects, wherein the constructing comprises:
adding, for each display element in the DOM tree that defines a dynamic portion of the page, a logic object to the logic tree, wherein the logic object registers as an event listener for DOM events associated with the display element and is at a same hierarchical level within the logic tree as the particular hierarchical level at which the display element resides in the DOM tree, and, when executed, carries out a particular action within the page;
render the static portions of the page based on the DOM tree; and
render the dynamic portions of the page based on both the DOM tree and the logic tree; and a memory coupled to the processor and configured to provide instructions to the processor.

22. The system as recited in claim 21, wherein the display definition portion of a component of the plurality of components comprises an XHTML template or tag.

23. The system as recited in claim 21, wherein the logic portion of a component of the plurality of components comprises a software object.

24. The system as recited in claim 21, wherein a component of the plurality of components includes one or more declarations.

25. A computer program product for generating a page, the computer program product being embodied in a non-transitory computer readable storage medium and comprising computer instructions for:
receiving, at a client, a plurality of components of the page, the plurality of components comprising a root component and one or more child components, each component being associated with at least a part of the page and each component comprising at least one of a display definition portion and a logic portion;
constructing, at the client and based on the plurality of components, a document object model (DOM) tree that defines a hierarchy of display elements, wherein each display element defines either a static portion of the page or a dynamic portion of the page and resides at a particular hierarchical level within the DOM tree, and wherein one of the display elements in the DOM tree is a page-level display element that defines a dynamic portion of the page;
constructing, at the client and based on both the DOM tree and the plurality of components, a logic tree that defines a hierarchy of logic objects, wherein the constructing comprises:
adding, for the page-level display element in the DOM tree, a page-level logic object in the logic tree that registers as an event listener for all DOM events that occur within the page; and
adding, for each additional display element in the DOM tree that defines a dynamic portion of the page, a logic object to the logic tree, wherein the logic object is at a same hierarchical level within the logic tree as the particular hierarchical level at which the display element resides in the DOM tree, and, when executed, carries out a particular action within the page;
rendering, at the client, the static portions of the page based on the DOM tree; and
rendering, at the client, the dynamic portions of the page based on both the DOM tree and the logic tree.

26. The computer program product as recited in claim 25, wherein the display definition portion of a component of the plurality of components comprises an XHTML template or tag.

27. The computer program product as recited in claim 25, wherein the logic portion of a component of the plurality of components comprises a software object.

28. The computer program product as recited in claim 25, wherein a component of the plurality of components includes one or more declarations.

29. The computer program product as recited in claim 25, wherein a component of the plurality of components includes one or more binding declarations.

30. A computer program product for providing a page, the computer program product being embodied in a non-transitory computer readable storage medium and comprising computer instructions for:
receiving from a client a request for the page; and
sending to the client a plurality of components of the page, the plurality of components comprising a root component and one or more child components, each component being associated with at least a part of the page and each component comprising at least one of a display definition portion and a logic portion;
constructing, at the client and based on the plurality of components, a document object model (DOM) tree that defines a hierarchy of display elements, wherein each display element defines either a static portion of the page or a dynamic portion of the page and resides at a particular hierarchical level within the DOM tree;
constructing, at the client and based on both the DOM tree and the plurality of components, a logic tree that defines a hierarchy of logic objects, wherein the constructing comprises:
adding, for each display element in the DOM tree that defines a dynamic portion of the page, a logic object to the logic tree, wherein the logic object registers as an event listener for DOM events associated with the display element and is at a same hierarchical level within the logic tree as the particular hierarchical level at which the display element resides in the DOM tree, and, when executed, carries out a particular action within the page;
rendering, at the client and based on the DOM tree, the static portions of the page; and
rendering, at the client and based on both the DOM tree and the logic tree, dynamic portions of the page.

* * * * *